March 29, 1932. A. W. MORTON 1,851,108
PISTON PACKING
Filed March 7, 1931
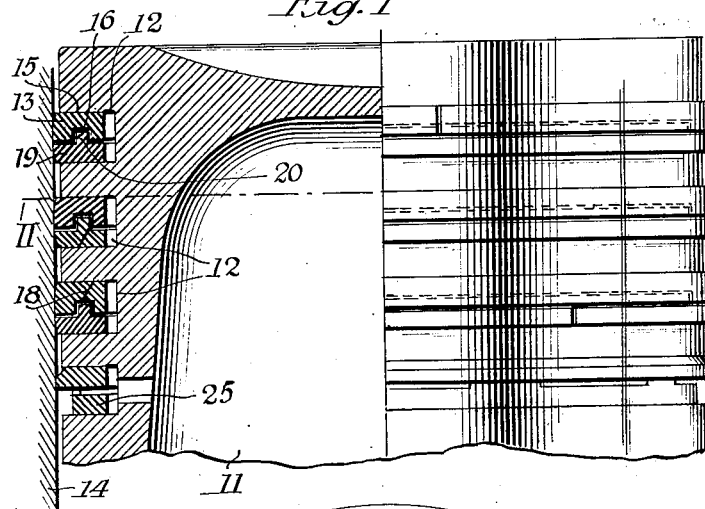
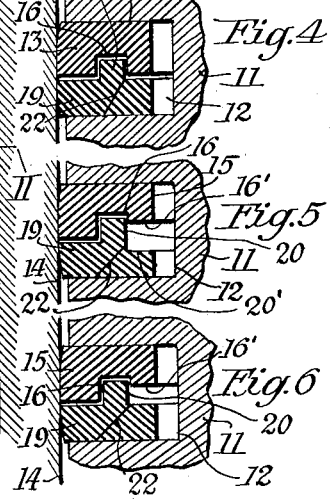
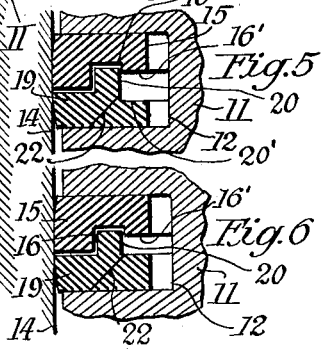
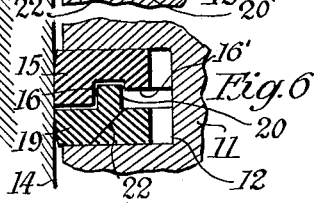
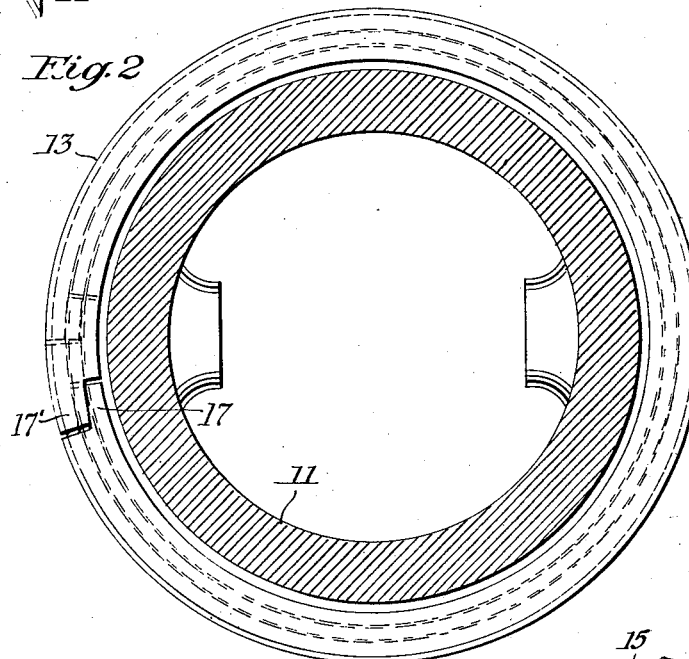
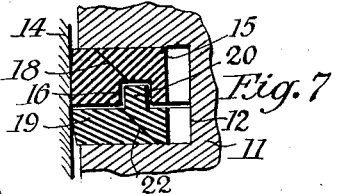
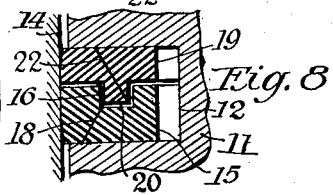
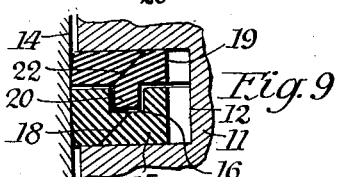
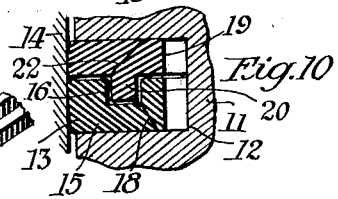
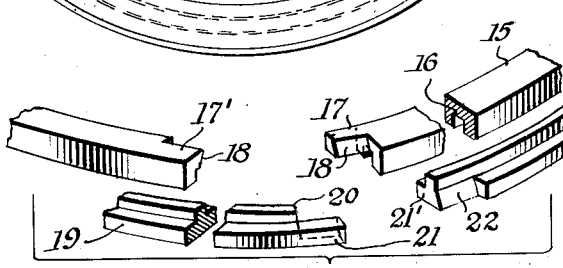
Inventor:
Allen W. Morton
By Dodge and Sons
Attorneys Patented Mar. 29, 1932

1,851,108

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON PACKING

Application filed March 7, 1931. Serial No. 520,918.

My invention relates to piston packings, and particularly to packings made up of a plurality of interfitting rings.

One of the objects of my invention is to produce a packing made up of two rings in which radial leakage of gas pressure through the ring joints is positively prevented by a novel arrangement of these joints.

Another object of my invention is to provide a ring which is simple to manufacture and assemble because of the absence of pins or other means for preventing rotation of the rings one relatively to the other, and in which means of this character are unnecessary because the ring joints are sealed in all positions and the rings are free to rotate to a position in which the most perfect cylinder contact is obtained.

Still another object of my invention is to produce a packing composed of rings of large section adapted to be forced axially against the sides of the ring grooves by gas pressure, and in which the rings have broad bearings on the lands of the grooves, thereby reducing groove wear.

A further object of the invention is to produce a packing in which the interfitting parts are sealed by the oil which is forced between them by the pressure within the cylinder.

Other objects will appear from the following specification when read in connection with the accompanying drawings, in which:—

Fig. 1 is a view, partly in section and partly in elevation, of a piston having mounted therein packings embodying my invention, the piston being shown inside of a cylinder;

Fig. 2 is a section on line II—II of Fig. 1, with the cylinder omitted;

Fig. 3 is a fragmentary perspective view of one form of ring joint embodying my invention, the joint being split apart and certain of the parts being shown in section;

Fig. 4 is an enlarged section of the ring shown in Figs. 1 and 2, showing the relation of the ring, piston and cylinder wall;

Figs. 5 and 6 are sectional views, similar to Fig. 4, of modified forms of packing;

Figs. 7 to 10 are similar sectional views showing modified arrangements of the ring joints.

Similar reference characters refer to similar parts in each of the several views.

Referring first to Fig. 1, the reference character 11 designates a conventional form of piston, such as is employed in internal combustion engines of the Diesel type. This piston contains annular ring grooves 12 having seated therein packings 13, which contact with the inner face of cylinder wall 14. As here shown, the top three ring grooves contain packings embodying my invention, while the bottom ring groove is shown as containing a conventional oil ring 25.

Each of the packings 13 comprises split rings 15 and 19. Ring 15 contains an annular groove 16 cut in one side face thereof, the free ends of the ring adjacent the split terminating in legs 17, 17'. These legs have inclined faces 18 which meet in a plane intersecting one side face of the ring and one wall of the groove 16, but the plane of intersection 18 does not intersect the inner or outer circumference of the ring. The advantage of this arrangement is that no radial passageway is formed between the inner and outer faces of the ring; hence, leakage and blow-by to the rear of the ring are effectively prevented.

The split ring 19 has an annular upstanding tongue 20 extending entirely around it and adapted to enter and interfit with the groove 16 in ring 15. The two ends of ring 19 adjacent the split terminate in two legs 21 and 21', each having an inclined face 22, these faces meeting in a plane which intersects the one flat side face of ring 19 and the other side face in proximity to the tongue 20. This joint is of the same type as the joint previously described in connection with ring 15, and has the same advantages.

The manner in which rings 15 and 19 are assembled to form a complete packing will be obvious from an inspection of Figs. 1 to 4, wherein the ring 19 is seated in the bottom of the ring groove, and ring 15 is placed on top of ring 19 with the tongue 20 interfitting with the groove 16 so that the two rings form a packing and substantially fill the ring groove in an axial direction.

The groove 16 is preferably made of somewhat greater radial width than the corresponding radial width of tongue 20 so as to allow the two rings to move freely in a radial direction, and to produce a tight seal against the cylinder wall. When the packing is assembled in this manner, it will be clear that there is no radial path between the inner and outer circumferences of the packing, on account of the tongue and groove construction of the two rings forming the packing and also on account of the form of the joints in the two rings, which do not intersect either the outer or inner circumferences of the rings in the same radial plane. This is true regardless of the circumferential position of either or both of the rings, and because of this construction it is unnecessary to provide any means for preventing relative rotation of the two rings. When a packing of this character is installed in a cylinder which is slightly out of round, the rings are free to rotate and to take up a position wherein the most natural and effective cylinder-contacting bearing results.

By reference to the two intermediate grooves in Fig. 1, the position of the planes of contact of the faces of the joints in ring 19 and also in ring 15 are apparent. Not only do these rings prevent radial leakage between the inner and outer faces, but they present broad flat uninterrupted land-engaging surfaces which minimize wear on the groove lands. They also present practically an uninterrupted cylinder-contacting surface so that compression loss is reduced to a minimum. It will likewise be noted that the cylinder-contacting portions of these rings are of large cross section so as to withstand long wear without any material weakening of the parts, and by placing the tongue and groove near the inner circumference of the packing, the life of the packing can be considerably lengthened.

When the packing is installed in a ring groove, the combined axial width of the two rings may be less than the width of the groove so as to allow gas pressure to enter between the ring and the ring groove and pass by the packing. In such a case, the subsequent action of the pressure will be to force the rings axially against the sides of the ring groove, thereby rendering the sealing of the piston more effective and maintaining such seal as the rings become worn.

This sealing action may be facilitated by a construction such as shown in Fig. 5, wherein the inner wall of ring 15 adjacent groove 16 is cut away for a short distance at 16' and the bottom ring 19 is likewise cut away adjacent the tongue 20 at 20' so as to afford a larger surface of entry for this gas pressure. A similar result may be obtained by merely cutting away a portion of the ring 15, as in Fig. 6.

A shown in Figs. 1 to 4, the planes of contact of the faces of the ring joints designated 18 and 22 are approximately parallel when the rings are assembled, and the inclination is inward and upward from the periphery of the packing. In some instances, it may be desirable to reverse this inclination, as shown in Fig. 7, in order to make the piston seal more effective.

Fig. 8 shows a further modified form wherein the two planes of contact of faces 18 and 22 are placed form an angle with respect to one another, and the plane of faces 22 passes through the tongue 20. Likewise, in this modification the ring 15 is placed in the bottom of the ring groove, and the ring 19 in the top of the groove.

In Fig. 9, the two planes formed by faces 18 and 22 are substantially parallel and ring 15 is again shown as being placed in the bottom of the ring groove but the plane of faces 22 does not intersect the tongue 20.

Fig. 10 is still another arrangement wherein the planes of faces 18 and 22 are angularly disposed to one another and the ring 15 is in the bottom of the groove, but in this case, the plane 22 inclines inwardly and the plane 18 also inclines inwardly but downwardly from the periphery of the piston.

I am well aware that in the prior art it is known to make packings of a plurality of split rings which interfit, but I believe that I am the first to provide a packing of this character having joints so constructed as to make it possible to have the two rings freely rotatable one relative to the other, without altering the efficacy of the packing even though the joints in the two rings should line up.

It is to be understood that, although I have herein shown and described only a few embodiments of piston packings constructed in accordance with my invention, various other arrangements may be adopted and I do not desire to be limited, except as such limitations are necessarily imposed upon the claims.

What is claimed is:—

1. A piston packing comprising two split rings each having an overlapping joint in which the plane of overlap intersects the side faces only of the ring, one of said rings containing an annular groove in one side face and the other a corresponding annular tongue coacting with said groove, and said rings being capable of free rotation one with respect to the other.

2. A piston packing comprising a first split ring having an annular groove in one of its side faces; a second split ring having an annular tongue fitting into the groove of said first ring, said rings being capable of free relative rotation, and the planes of joint overlap in said rings intersecting the side faces only of the respective rings.

In testimony whereof I have signed my name to this specification.

ALLEN W. MORTON.